United States Patent [19]
Grünleitner et al.

[11] 3,916,272
[45] Oct. 28, 1975

[54] SPEED CONTROL FOR AN ELECTRONIC COMMUTATED D-C MOTOR

[75] Inventors: Hans Grünleitner; Manfred Liska, both of Nurnberg, Germany

[73] Assignee: Siemens Aktiengesellschaft, Munich, Germany

[22] Filed: Mar. 5, 1974

[21] Appl. No.: 448,294

[30] Foreign Application Priority Data
Mar. 9, 1973 Germany............ 2311904

[52] U.S. Cl. .................. 318/138; 318/254
[51] Int. Cl.² ............... H02K 29/02; H02P 5/06
[58] Field of Search ............ 318/138, 254, 331, 439

[56] References Cited
UNITED STATES PATENTS

| | | | |
|---|---|---|---|
| 3,651,368 | 3/1972 | Hanada | 318/254 |
| 3,688,172 | 8/1972 | Sieber et al. | 318/138 |
| 3,716,769 | 2/1973 | Brunner | 318/138 |

*Primary Examiner*—Robert K. Schaefer
*Assistant Examiner*—John J. Feldhaus
*Attorney, Agent, or Firm*—Kenyon & Kenyon Reilly Carr & Chapin

[57] ABSTRACT

An improved speed control arrangement for a brushless d-c motor in which the e.m.f. induced in the stator winding is taken off through diodes to provide an actual value input for a speed control circuit with the take-off diode being coupled through the emitter-collector path of a transistor having its base coupled to the neutral point of the stator windings and in which the control element for controlling speed is placed in the line coupling the neutral point to one terminal of the voltage.

5 Claims, 2 Drawing Figures

SPEED CONTROL FOR AN ELECTRONIC COMMUTATED D-C MOTOR

BACKGROUND OF THE INVENTION

This invention relates to motors in general, and more particularly to electronically commutated motors with controllable speeds.

Motors of this nature have been developed in which the phase windings are generally Y-connected at one end and coupled to a d-c voltage of one polarity with the other ends of the individual stators coupled through a commutation arrangement to a d-c voltage of the opposite polarity. At the commutation end of the windings, take-off diodes are installed with all the take-off diodes coupled together at their opposite end and the signal at this common point provided as an actual value input to a speed control.

The speed control then compares this actual value with a desired value and provides an output used to control a control element in one of the two motor leads from the power supply. Typical of such a motor is that disclosed in "ETZ-B," vol. 24 p. 295 to 298 (1972). In the motor disclosed therein, the speed proportional e.m.f., which is provided by the take-off diodes, has as its reference the neutral point of the stator winding or the side of the d-c voltage source which is connected to this neutral point. Thus, the neutral point becomes the reference potential for the system. The control element which is controlled by the speed control is placed between the other side of the d-c source and the commutation arrangement. As a result, the reference potential for the control circuit of the commutator changes as a function of the manner in which the control element is driven. This can lead to an impairment of commutation when the control element is controlled down at low speeds. Thus, reliable operation of this known type of motor cannot be assured at low speeds unless further measures are taken.

Thus, it can be seen that there is a need to overcome this disadvantage of motors of this type and to provide a motor which is operable over a wider speed range without requiring substantial additional circuitry.

SUMMARY OF THE INVENTION

The present invention provides a solution to this problem. In accordance with the present invention, the common point of the take-off diodes is coupled to the speed control circuit through the emitter collector path of a transistor which has its base coupled to the neutral point of the stator winding. The speed control arrangement has as its reference the side of the d-c source which is coupled to the commutation arrangement and the control element used for speed control is placed in the line from the other side of the d-c source, i.e., it couples the other side to the common point of the Y-connected stator windings or neutral point.

Since the actual value provided to the speed control will be influenced by the threshold voltage of the take-off diodes and the base emitter path of the transistor, particularly at low speeds, a preferred embodiment of the invention includes a compensation circuit which couples the base of the transistor to the neutral point of the windings. That is, since the threshold voltages are constant and furthermore, since the induced e.m.f. at low speed becomes increasingly smaller, the error contribution of these threshold values becomes proportionally greater at low speeds. Thus, it is desirable that this compensation circuit be used.

DETAILED DESCRIPTION OF THE PREFERRED EMBODIMENT

Figure 1:
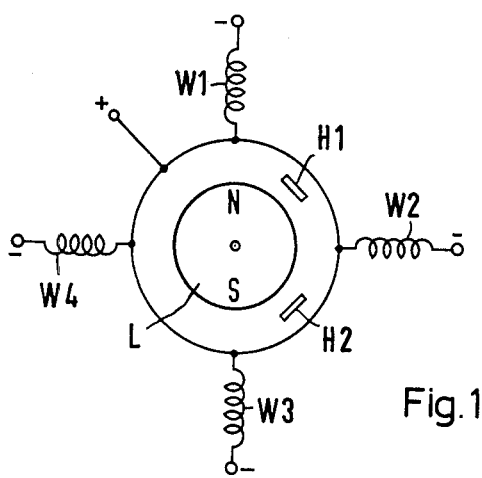
FIG. 1 is a schematic presentation of a speed-controllable brushless d-c motor using Hall-effect generators for controlling commutation.

FIG. 1 illustrates in schematic form the basic arrangement of a brushless d-c motor using the speed control arrangement of the present invention. The stator windings of the motor are designated W1, W2, W3 and W4 and are all tied together in a Y-arrangement which is then coupled to the positive terminal of a d-c source in a manner to be more fully described below. The other ends of the stator windings are each coupled to the negative terminal of the d-c source through a commutation arrangement also to be more fully described in connection with FIG. 2. The rotor of the motor, designated L, has two permanent magnet poles designated N and S on the Figure. Two Hall-effect generators are arranged opposite the permanent magnet rotor L and displaced 90° from each other. In well known fashion, these Hall-effect generators are able to sense the rotor position to provide appropriate commutation signals to the commutationn arrangement as will be described below.

Figure 2:
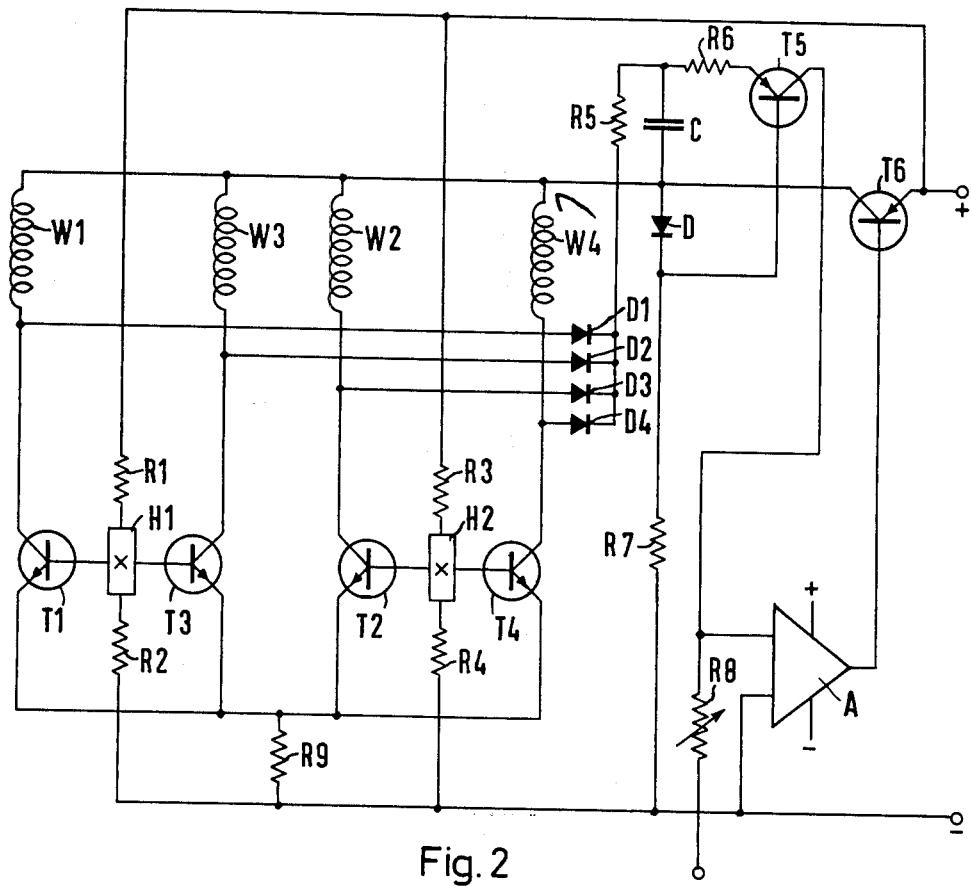
FIG. 2 is a circuit diagram of the speed control arrangement of the present invention.

As illustrated by FIG. 2, commutation is accomplished through the use of power transistors T1 through T4 associated with stator windings W1 to W4. Each transistor has its collector coupled to one end of its associated stator windings and its emitter coupled through a common emitter resistor R9 to the negative terminal of the d-c source. The power transistors T1 through T4 are controlled by Hall-effect generators H1 and H2. These Hall-effect generators have their control current leads coupled respectively through resistors R1 and R3 to the positive terminal and through resistors R2 and R4 to the negative terminal of the d-c supply. The output terminals of Hall-effect generator H1 are coupled to the bases of transistors T1 and T3 respectively and those of Hall-effect generator H2 to the bases of transistors T2 and T4 respectively.

Take-off diode D1 through D5 are provided and coupled to the commutation end of each of the windings W1 through W4. The other end of the diodes are all connected together and coupled through series resistors R5 and R6 to the emitter of a transistor T5. The junction of resistors R5 and R6 is coupled through a capacitor C to the neutral point of the stator winding. The base of transistor T5 is coupled to the junction of a diode D and resistor R7 in series between the neutral point and the negative terminal of the supply. This compensation diode D and compensation resistor R7 form a compensation circuit to correct for the threshold values associated with the diodes D1 through D4 and the base emitter path of transistor T5.

The collector of transistor T5 is coupled to one input of a control circuit, which in the case of the present embodiment comprises an operational amplifier. To the same terminal of the amplifier A is provided a desired value input through a variable resistor R8. The other terminal of the amplifier A is referenced to the negative voltage terminal of the d-c supply. Thus, the speed control and the commutation arrangement are both referred to the same potential. The output of the speed control amplifier A is connected to the base of a transistor T6, which has its emitter collector path coupling the neutral point of the stator windings to the positive terminal of the d-c supply. In well known fashion, in response to an output from amplifier A, the transistor T6 controls the voltage applied to the neutral point and thereby the speed of the d-c motor.

The input transistor T5 converts the speed proportional e.m.f. which is taken from the stator winding into a speed proportional current which is then supplied to the amplifier A. Through this arrangement, it is possible to have the amplifier A and the commutation arrangement both at the same reference potential. This in turn permits the control transistor T6 to be placed in the neutral point lead so that the reference potential for the control circuit of the commutation arrangement no longer depends on the drive of the control transistor. As a result, the commutation arrangement remains fully in control, without further circuit means, even if the control transistor T6 is cut off. As a result, the speed control range now attainable depends only on the required speed stability.

The compensation circuit, consisting of compensation diode D and compensation resistor R7, which is connected between the neutral point of the stator winding and the terminal of the d-c voltage source which is connected to the commutation arrangement, provides compensation of the threshold values of the take-off diodes D1 through D4 and the emitter-base path of the transistor T5 over the entire speed range. This results, since the compensation voltage is always proportional to the motor voltage and thus also to the speed of the motor. As a result, the threshold values of the take-off diodes D1 through D4 and the base emitter path of transistor T5 are always compensated proportionally to the speed.

Thus, an improved speed control arrangement for an electronically d-c motor has been shown. Although specific embodiments have been illustrated and described, it will be obvious to those skilled in the art that various modifications may be made without departing from the spirit of the invention, which is intended to be limited solely by the appended claims.

What is claimed is:

1. In an electronically commutated, speed controlled d-c motor, including stator windings each having one end thereof Y-connected so as to form a neutral point, a d-c voltage source having one terminal thereof coupled to said neutral point, a commutation arrangement coupled to the other ends of said stator windings and to the other terminal of said d-c voltage source, and a plurality of take-off diodes having one of the ends thereof coupled to said other ends of said stator windings and the other of the ends thereof connected together, the improvement comprising:
    an input transistor having the base terminal thereof coupled to said neutral point of said stator windings;
    an ohmic resistor, coupled at one end to the emitter terminal of said input transistor and at the other end to said connected ends of said diodes;
    a speed control circuit coupled to the collector terminal of said input transistor; and
    a control element coupled to said speed control circuit and to said neutral point of said stator windings.

2. The motor recited in claim 1, further comprising a compensation circuit coupled in series to the base terminal of said input transistor and to said neutral point of said stator windings.

3. The motor recited in claim 2, wherein said ohmic resistor comprises a pair of resistors coupled in series, and wherein said compensation circuit comprises a diode, coupled to the junction of said pair of resistors and to the base terminal of said input transistor, and a resistor coupled to said diode and base terminal and to said other terminal of said d-c voltage source.

4. The motor recited in claim 3, wherein said speed control circuit comprises an operational amplifier, having a first input terminal coupled to the collector terminal of said input transistor and a second input terminal coupled to said other terminal of said d-c voltage source, and variable resistance means, coupled to said first input terminal of said amplifier, for providing a selected input signal thereto.

5. The motor recited in claim 4, wherein said control element comprises a control transistor having the base terminal thereof coupled to said amplifier, the emitter terminal thereof coupled to said one terminal of said d-c voltage source, and the collector terminal thereof coupled to said neutral point of said stator windings.

* * * * *